(12) United States Patent
 Ashraf

(10) Patent No.: US 10,559,050 B2
(45) Date of Patent: Feb. 11, 2020

(54) SYSTEM AND METHOD OF ADDRESSING A PIECE OF MAIL

(71) Applicant: Ali Ashraf, Austin, TX (US)

(72) Inventor: Ali Ashraf, Austin, TX (US)

( * ) Notice: Subject to any disclaimer, the term of this patent is extended or adjusted under 35 U.S.C. 154(b) by 349 days.

(21) Appl. No.: 15/410,200

(22) Filed: Jan. 19, 2017

(65) Prior Publication Data

US 2017/0213309 A1    Jul. 27, 2017

Related U.S. Application Data

(60) Provisional application No. 62/286,020, filed on Jan. 22, 2016.

(51) Int. Cl.
*G06Q 90/00* (2006.01)
*G06Q 30/02* (2012.01)

(52) U.S. Cl.
CPC ......... *G06Q 90/00* (2013.01); *G06Q 30/0257* (2013.01); *G06Q 30/0261* (2013.01)

(58) Field of Classification Search
None
See application file for complete search history.

(56) References Cited

U.S. PATENT DOCUMENTS

| | | | | |
|---|---|---|---|---|
| 2002/0029248 A1* | 3/2002 | Cook | ................... | G06Q 10/107 709/206 |
| 2009/0307079 A1* | 12/2009 | Martin, Jr. | ........... | G06Q 20/102 705/14.36 |
| 2010/0114700 A1* | 5/2010 | Chamberlain | ......... | G06Q 30/02 705/14.52 |
| 2011/0087746 A1* | 4/2011 | Sagi | ..................... | G06Q 10/107 709/206 |
| 2014/0019561 A1* | 1/2014 | Belity | ..................... | H04L 51/22 709/206 |
| 2014/0074623 A1* | 3/2014 | Mohammadi | ...... | G06Q 30/0269 705/14.66 |
| 2014/0164076 A1* | 6/2014 | Marcos | ............. | G06Q 30/0641 705/14.4 |

* cited by examiner

*Primary Examiner* — Jamie R Kucab
(74) *Attorney, Agent, or Firm* — Kowert, Hood, Munyon, Rankin & Goetzel, P.C.

(57) ABSTRACT

An automated system and method for addressing a piece of mail. The system and method places mailing addresses from a scrubbed list of address onto advertisements.

19 Claims, 5 Drawing Sheets

Go paperless!
Redirect all participating direct mail ads
Save Paper, Money, Time, etc.

Mail reduction program URL

SYSTEM AND METHOD OF ADDRESSING A PIECE OF MAIL

PRIORITY CLAIM

This application claims priority to U.S. Provisional Application Ser. No. 62/286,020 entitled "DIRECT MAIL-TO-MOBILE/ONLINE CONVERSION SYSTEM AND METHOD" filed Jan. 22, 2016, which is incorporated herein by reference in its entirety.

BACKGROUND OF THE INVENTION

1. Field of the Invention

The invention generally relates to methods and systems for placing a mailing address on an advertisement.

2. Description of the Relevant Art

Bulk mail, commonly referred to as junk mail, is, predominantly, unsolicited advertisements sent to customers in a geographical area. Advertisers use bulk mail to deliver a printed advertisement to potential customers in the geographical area in the hopes of increasing business and/or sales or products. Since bulk mail is mixed in with regular mail, the potential customers must at least quickly look at the bulk mail to determine if the mail is important or not. In this manner, bulk mail succeeds in getting an advertisement into the hands of a customer in a manner that forces the customer to look at the advertisement. In a similar fashion, bulk mail is a common method of delivering coupons for products or services to customers in a geographical region.

Because marketing studies show bulk mail and direct mail continues to be effective, advertisers are willing to spend significant amounts of money on bulk mail advertising. Several data sources estimate that businesses spend about $45 billion per year on bulk mail. A major part of this expense is in postal fees for sending the bulk mail to the residents in a geographical area and the printing fees for printing the mail.

In contrast to bulk mail advertising, electronic advertising is significantly less expensive. Electronic advertising removes the costs of printing and mailing the advertisement. Once an advertisement is prepared, a single electronic copy of the advertisement can be sent or displayed in many different electronic & digital mediums. However, unlike bulk mail, electronic advertisements can be more easily ignored, and, in many instances are never seen. This leads to some hesitation by businesses to forgo bulk mail for electronic mail. Many businesses, instead, feel the need to use both forms of advertising, increasing the costs of advertising.

SUMMARY OF THE INVENTION

In an embodiment, a system is described for placing a mailing address on an advertisement. The system includes a printer and a processor coupled to the printer. The processor executes nontransitory program instructions. The program instructions are operable to obtain a scrubbed mailing address list of addresses in a geographical area to be placed on a plurality of copies of the advertisement and print each address of the scrubbed mailing address list on a single copy of the plurality of copies of the advertisement obtained from an advertiser. The scrubbed mailing address list is a list of addresses that includes less addresses than listed in the residential mailing address list associated with the geographical area.

The plurality of advertisements obtained from an advertiser may include an unprinted region for receiving a mailing address. The printer prints each address of the scrubbed mailing address list in the unprinted region. Alternatively, the printer may print a plurality of advertisements, each of the plurality of advertisements including an unprinted region for receiving a mailing address. Alternatively, the printer may print each address of the scrubbed mailing address list on the advertisement simultaneously with the printing of the plurality of copies of the advertisement. Alternatively, the printer may print each address of the scrubbed mailing address into a designated region of a blank page. The addressed blank page may then be sent to an advertiser, who prints the advertisement on the addressed blank page.

The scrubbed mailing address list is obtained by: receiving notifications from one or more people associated with a residential mailing address in the geographical area, wherein the notification comprises a consent, by the person sending the notification, to receive an electronic representation of the advertisement and the notification also contains the residential mailing address of the person sending the notification; creating an electronic delivery list comprising a list of the one or more people sending the notifications and the residential mailing address associated with each of the one or more people sending the notifications; and removing one or more residential mailing addresses, associated with electronic delivery list, from the residential mailing address list associated with the geographical area to create the scrubbed mailing address list for the geographical area. The electronic delivery list may be used by multiple different advertisers (participating in the program) to prepare a scrubbed mailing address list.

The program instructions are further operable to print an opt-in message on each copy of the plurality of copies of the advertisement, wherein the opt-in message comprises instructions, for a person who receives the advertisement, for sending the notification to receive the advertisement electronically.

In an embodiment, an automated method for placing a mailing address on an advertisement includes: obtaining a plurality of copies of the advertisement to be sent to a plurality of residential mailing addresses associated with a geographical area; obtaining a scrubbed mailing address list in the geographical area to be placed on the plurality of copies of the advertisement, wherein the scrubbed mailing address list is a list of addresses that includes less addresses than the residential mailing address list associated with the geographical area; and placing each address of the scrubbed mailing address list on a single copy of the plurality of copies of the advertisement.

In the method, the plurality of advertisements obtained from an advertiser may include an unprinted region for receiving a mailing address. The printer prints each address of the scrubbed mailing address list in the unprinted region. Alternatively, the printer may print a plurality of advertisements, each of the plurality of advertisements including an unprinted region for receiving a mailing address. Alternatively, the printer may print each address of the scrubbed mailing address list on the advertisement simultaneously with the printing of the plurality of copies of the advertisement. Alternatively, the printer may print each address of the scrubbed mailing address into a designated region of a blank page. The addressed blank page may then be sent to an advertiser, who prints the advertisement on the addressed blank page.

In an embodiment, the method also includes sending an electronic representation of the advertisement(s) to one or more people associated with a residential mailing address in the geographical area who are on the electronic delivery list and therefore are not on the scrubbed mailing address list in the geographical area.

The scrubbed mailing address list is obtained by: receiving notifications from one or more people associated with a residential mailing address in the geographical area, wherein the notification comprises a consent, by the person sending the notification, to receive an electronic representation of the advertisement and a residential mailing address of the person sending the notification; creating an electronic delivery list comprising a list of the one or more people sending the notifications and the residential mailing address associated with each of the one or more people sending the notifications; and removing one or more residential mailing addresses, associated with the electronic delivery list, from the residential mailing address list associated with the geographical area to create a scrubbed mailing address list for the geographical area. The electronic delivery list may be used by multiple different advertisers (participating in the program) to prepare a scrubbed mailing address list. In some embodiments, the electronic delivery list can be distributed to the various advertisers participating in the program. As the electronic delivery list is updated, by more residents signing up for the program, the electronic delivery list will be periodically distributed to all of the participating advertisers.

In an embodiment, an electronic account for each person associated with the electronic delivery list, wherein the electronic account comprises a user interface that allows each person associated with the electronic delivery list to access an electronic representation of the advertisement(s)

To verify the mailing address of the resident, the method also includes obtaining a confirmation that the person sending the notification resides at the residential mailing address associated with the notification.

An opt-in message may be placed on each copy of the plurality of copies of the advertisement, wherein the opt-in message comprises instructions, for a person who receives the advertisement, for sending the notification to receive the advertisement electronically. Alternate methods of providing opt-in messages may be uses and are discussed herein.

A confirmation, that one or more people associated with the scrubbed mailing address list for the geographical area have accessed the electronic representation of the advertisement, may be sent to ensure compliance by the resident.

In an embodiment, the method includes adding a person back to the scrubbed mailing address list for the geographical area, if the person does not access the electronic representation of the advertisement according to the program rules.

BRIEF DESCRIPTION OF THE DRAWINGS

Advantages of the present invention will become apparent to those skilled in the art with the benefit of the following detailed description of embodiments and upon reference to the accompanying drawings in which.

Figure 1:
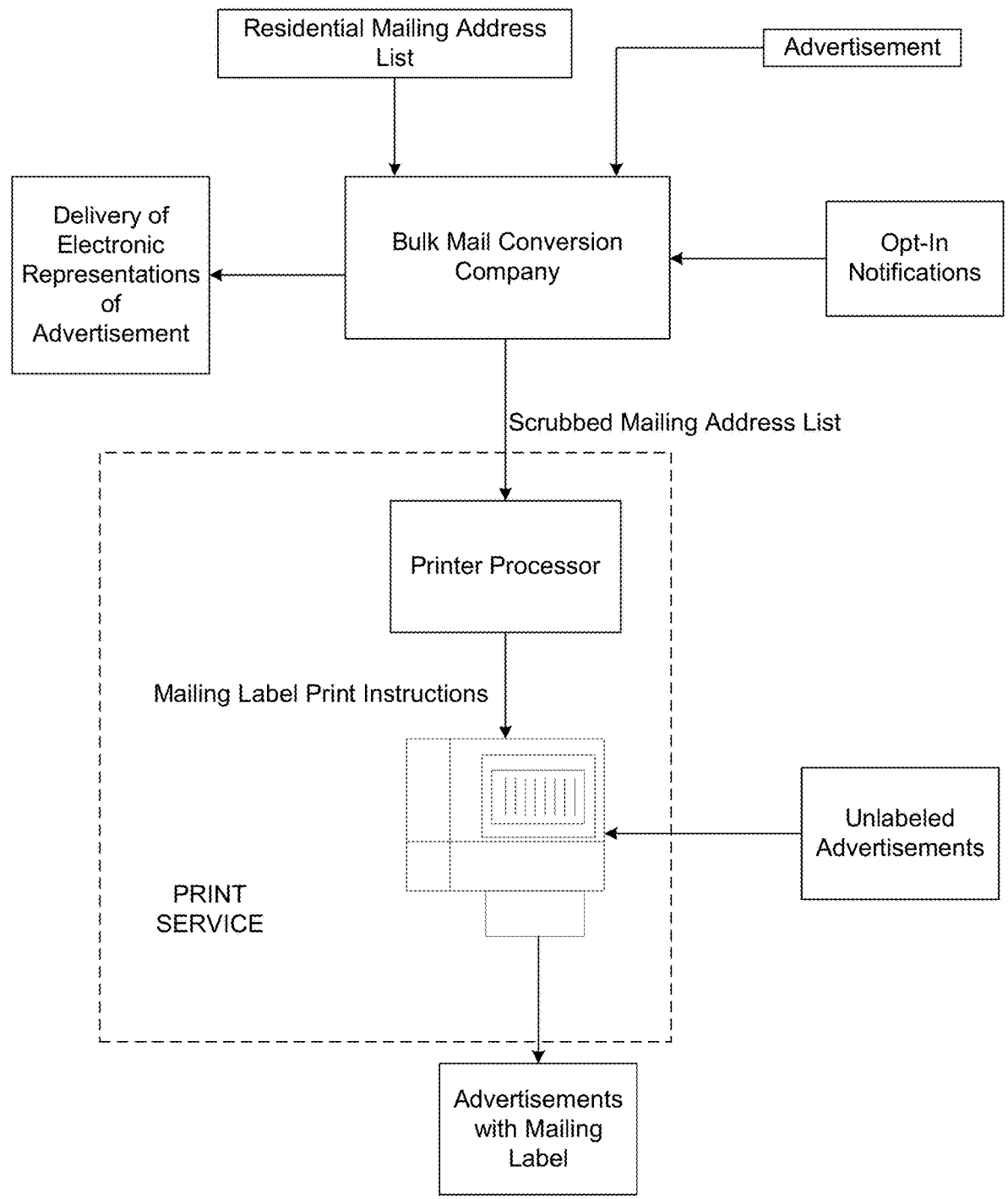
FIG. 1 depicts a schematic diagram of a print service which works with a mail reduction program, where advertisements (electronic or paper) are provided to the print service and a scrubbed mailing address list is provided to the print service by the Bulk Mail Company

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

In an embodiment, an automated method is used for placing a mailing address on an advertisement. As used herein the term "advertisement" is a medium promoting a product, service, or event. Examples of advertisements that may be mailed include, but are not limited to, circulars (e.g., an advertisement having prices for selected store items), coupons, catalogs, letters, and brochures.

Generally, advertisers wish to present their advertisements to as many people as possible within a geographical area. Examples of geographical areas include, but are not limited to, a city, a postal code mailing area, a country, a state, a region of a country (northeast, south, etc.), a school district, and a neighborhood. Advertisers use mail delivery to send advertisements to the residents in a geographical area. Ideally, the advertiser wants to reach every resident in the geographical area. To achieve this, most advertisers use a residential mailing address list. As used herein the term "residential mailing address list" is a list of residential mailing addresses that includes every, or close to every, residential mailing address in the geographical area. As used herein the term "residential mailing address" is a mailing address associated with the home or an apartment complex and unit number in the geographical area. Known business addresses are typically not present in a list of residential mailing addresses, although they can be.

Mailed advertisements can range from $0.25 to several dollars per item. Sending an advertisement to every resident in a geographical area can, therefore, be very expensive. To reduce mailing, and other costs, it is desirable to send advertisements to at least some of the residents as an electronic representation instead. As used herein an "electronic representation of an advertisement" is a substantial copy of the advertisement that can be viewed on a display screen. Electronic representations of an advertisement include, but are not limited to, text messages, internet messaging, social media postings, digital photographs (.jpg; .bmp, .png, .gif, etc.), and website pages.

In one embodiment of implementing this strategy, a list of residents in a geographical area that wish to receive an electronic representation of an advertisement is generated, herein referred to as the "electronic delivery list." The electronic delivery list includes an identifier associated with the resident (e.g., a log-in ID or an email address) and the mailing address associated with the resident, for each resident on the electronic delivery list. Residents listed on the electronic delivery list are then removed from the residential mailing address list to generate a "scrubbed mailing address list." The scrubbed mailing address list will, therefore, only include residents who have not subscribed to electronic delivery of the advertisement. The scrubbed mailing list does not include any residents or mailing addresses on the electronic delivery list.

Once the scrubbed mailing address list is generated, the advertiser can place mailing addresses on the advertisements using the scrubbed mailing address list, rather than the residential mailing address list. This will reduce the number of advertisements that are mailed, and thus the cost to the advertiser since residents on the Electronic Delivery List would receive an electronic version of the advertisement instead. The scrubbed mailing list is provided to the advertisers in a format that allows the advertiser to make modifications such as removing addresses that have been provided from a do-not-mail service.

The scrubbed mailing address list may be prepared by the advertisers or by a third party. As used herein the term "mail reduction program" will refer to any program (implemented by an advertiser or a third party company) which reduces the number of advertisements sent using a bulk mail campaign by sending at least some of the advertisements to residents as electronic representation of the advertisement.

Figure 5:
FIG. 5 depicts an exemplary opt-in message that is placed on a printed advertisement.

In this embodiment, the mail reduction program receives notifications from one or more people associated with a residential mailing address in the geographical area. The notifications include consent, by the person sending the notification, to receive an electronic representation of the advertisement and a residential mailing address of the person sending the notification. In one embodiment, an opt-in message may be placed on each copy of a bulk mail advertisement. The opt-in message includes instructions, for a person who receives the advertisement, for sending the notification to the mail reduction program to receive the advertisement electronically. An example of an opt-in message is depicted in FIG. 5.

Notifications may be sent to the mail reduction program by a number of different methods. In one embodiment, the opt-in message may include a website URL which the resident can use to access the mail reduction program. The website may include links that allow the user to sign up ("opt-in") to the electronic delivery list. Using the website links, the resident may then send a notification to the mail reduction program which provides the necessary information for the resident to be added to the electronic delivery list. In an alternate embodiment, the opt-in message may include a QR code, or other similar mobile device link, which can be used by a mobile electronic device to access the website to opt-in to the electronic delivery list. Exemplary mobile device links include an "HTML" link, or any other type of link, that takes the resident to the opt-in website. The mobile device link may also be a notification to direct the reader to access a website. In some embodiments, a mobile device may be a notification that directs the reader to an app that is available from Apple (iTunes), Android (Play Store) or other mobile device application stores. Alternatively, electronic advertisements on websites may be used to promote the electronic delivery of bulk mail advertising. The website advertising may include links that a person may use to access the mail reduction program website.

In some embodiments, the opt-in message to the recipient may be a listing of the name of the application or website, which the resident can use to find the application or website. An example of such a listing may be "Look for the APP in iTunes or the Google Play store."

Notifications may also be sent to the mail reduction program using a dedicated application that can be used by a mobile electronic device or computer system. The application may be accessed by a QR code embedded in the opt-in message. Alternatively, electronic advertisements on websites may be used to promote the electronic delivery of bulk mail advertising. The website advertising may include links that a person may use to download the application to their mobile device or computer. In some embodiments, the opt-in message may include coupons or gift card offers to entice the resident to enroll in the program.

The mail reduction program creates an electronic delivery list based on the information received in the opt-in notifications sent by residents. The electronic delivery list includes, at a minimum a list of an electronic identifier for one or more people sending the notifications and the residential mailing address associated with each of the one or more people sending the notifications.

The mail reduction program then uses the electronic delivery list to generate the scrubbed mailing address list. The scrubbed mailing address list is prepared by removing one or more residential mailing addresses, associated with the electronic delivery list, from the residential mailing address list associated with a geographical area to create the scrubbed mailing address list for the geographical area. Residents on the electronic delivery list would receive electronic versions of the advertisements they would have otherwise received in the mail.

Details regarding the implementation of internet or application based sign up programs are discussed in: U.S. Pat. No. 8,073,732 to Ghosh et al.; U.S. Pat. No. 8,849,258 to Hurowitz et al.; U.S. Pat. No. 9,384,379 to Koster; and U.S. Patent Application Publication No. 2014/0040038 to Hermanowski et al., all of which are incorporated herein by reference.

FIG. 1 depicts a schematic diagram of placing mailing addresses on advertisements. Traditionally, the process starts by obtaining a residential mailing address list which includes most, or all, of the residential addresses in a selected geographical area. The residential mailing address list is sent to the mail reduction program. As described above, the mail reduction program receives notifications from residents to opt-in to the program to receive electronic representations of the advertisement, instead of mailed advertisements. The mail reduction program will also receive a copy of the advertisement as either a printed copy or an electronic representation of the advertisement. The mail reduction program then generates the scrubbed mailing address list and forwards this list to a printing service. A printing service may be a commercial printing service, or an in house printing service operated by the advertiser. The printing service obtains an unlabeled advertisement to be labeled with mailing addresses from an advertiser. The printing service also obtains the scrubbed mailing address list for the geographical area into the printer processor. The printer then places each address of the scrubbed mailing address list on a single copy of the plurality of copies of the advertisement. In one embodiment, each of the plurality of advertisements comprises an unprinted region for receiving a mailing address. The printing service then places each address of the scrubbed mailing address list in the unprinted region of one of the plurality of advertisements provided by the advertiser. Systems and methods for placing mailing addresses on pieces of mail are described in U.S. Pat. No. 8,793,195 to Weinberg et al., which is incorporated herein by reference.

Figure 2:
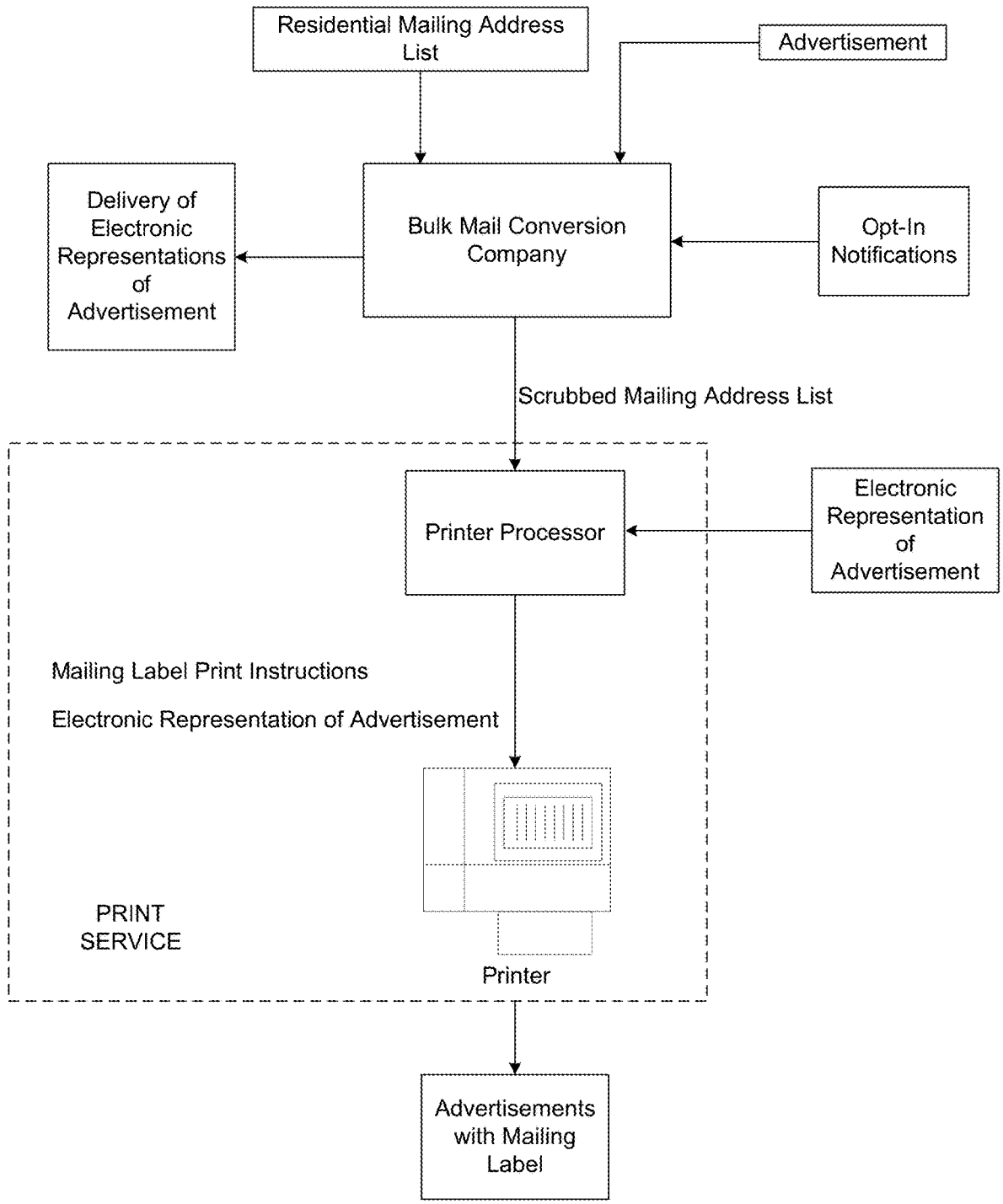
FIG. 2 depicts a schematic diagram of a print service which works with a mail reduction program, where advertisements are prepared by the print service and a scrubbed mailing address list is provided to the print service by the Bulk Mail Company.

In an alternate embodiment, depicted in FIG. 2, the printing service prints a plurality of advertisements. The printing service may receive an electronic representation of the advertisement(s) and use the electronic representation to produce paper copies of the advertisement(s). The printing service leaves an unprinted region for printing a mailing address on each of the advertisements. The printing service, in a subsequent step, then places each address of the scrubbed mailing address list in the unprinted region of one of the plurality of advertisements provided by the advertiser. Alternatively, each address of the scrubbed mailing address list is printed on the advertisement simultaneously with the printing of the plurality of advertisements. Alternatively, the printer may print each address of the scrubbed mailing address into a designated region of a blank page. The addressed blank page may then be sent to an advertiser, who prints the advertisement on the addressed blank page.

Figure 3:
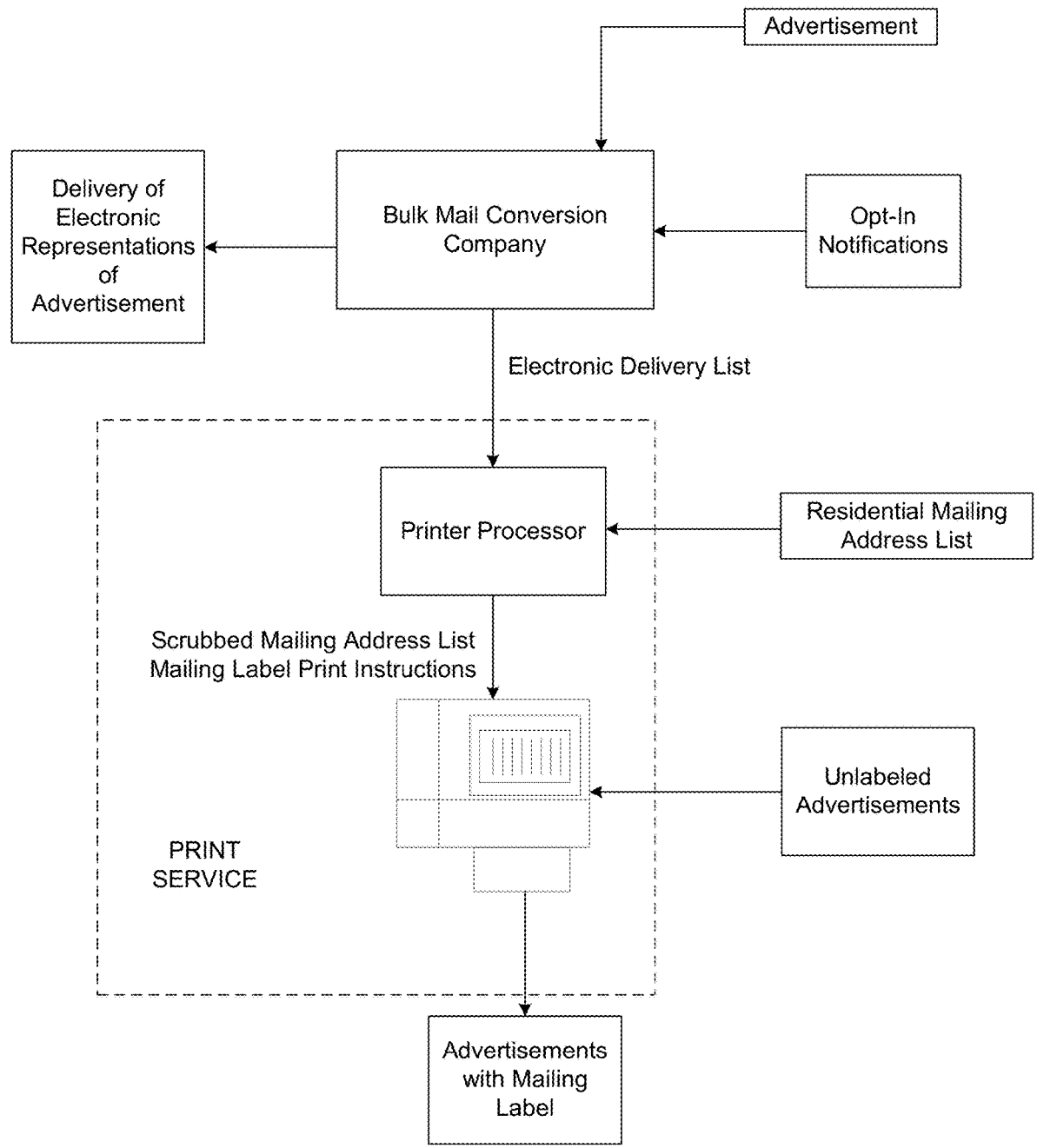
FIG. 3 depicts a schematic diagram of a print service which works with a mail reduction program and generates a scrubbed mailing address list, where advertisements (electronic or paper) are provided to the print service.
Figure 4:
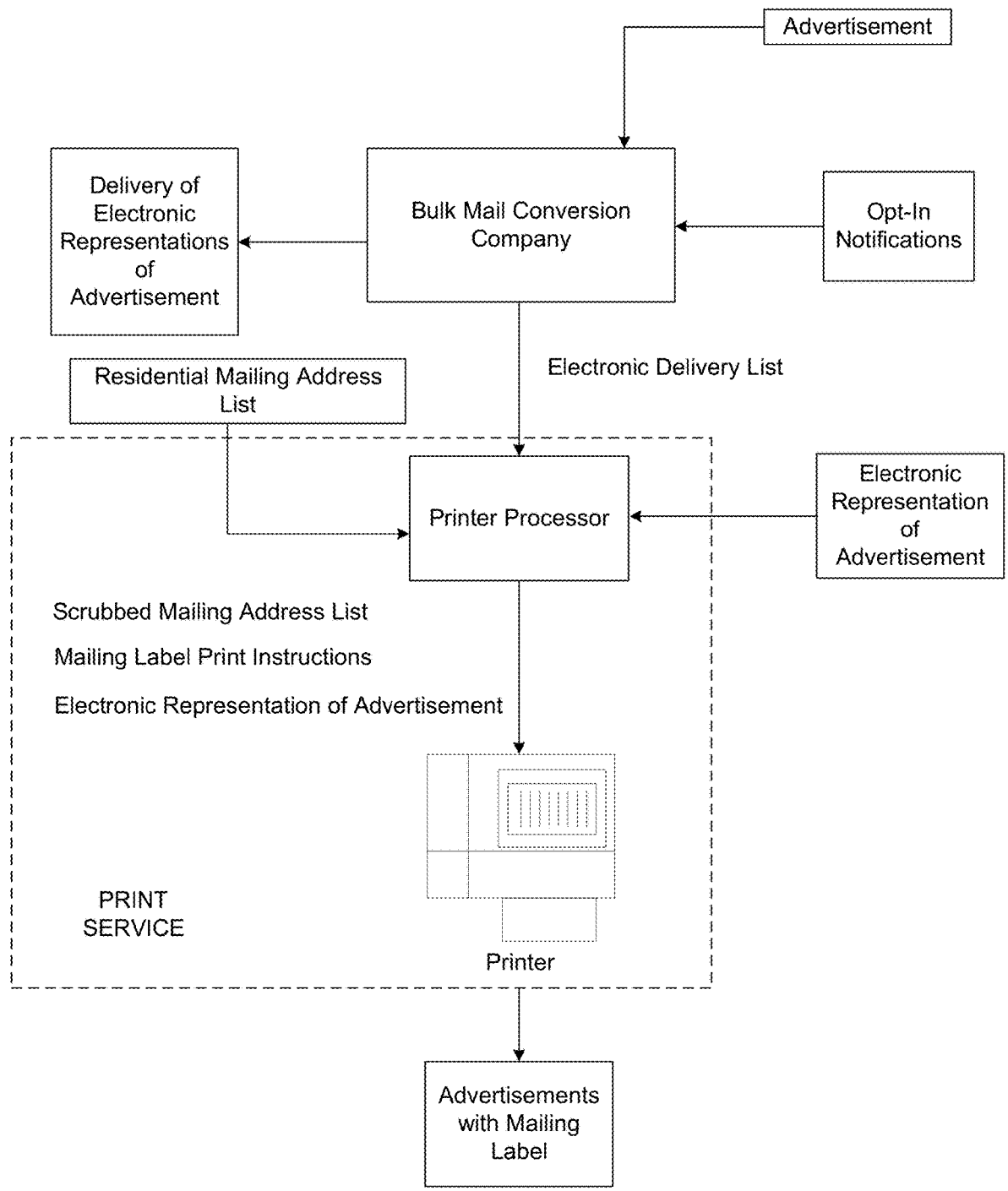
FIG. 4 depicts a schematic diagram of a print service which works in with a mail reduction program, and generates a scrubbed mailing address list, where advertisements are prepared by the print service.

An alternate embodiment of the printing service of FIG. 1 is shown in FIG. 3. In the printing system of FIG. 3, the print service creates the scrubbed mailing address list by removing residents on the electronic delivery address (received from the Bulk Mail Conversion Company) from a residential mailing address list. Similarly, FIG. 4 depicts an alternate embodiment of the printing system of FIG. 2. Similar to the system shown in FIG. 3, the print service creates the scrubbed mailing address list by removing residents on the electronic delivery address (received from the Bulk Mail Conversion Company) from a residential mailing address list. The residential mailing list used by the advertiser may be an unedited residential mailing list, or may be an edited residential mailing list that the advertiser has already modified against a "do not mail list" obtained from other sources or compiled based on customer or resident complaints.

In addition to reducing the number of advertisements that are mailed to residents, the method also includes sending an electronic representation of the advertisement to one or more people associated with a residential mailing address in the geographical area that are not on the scrubbed mailing address list in the geographical area and who have opted-in to the program. An electronic representation may be sent to the people on the electronic delivery list via a variety of different processes. In other words, residents and customers who have opted-in, and are thus in the electronic delivery list, will receive electronic versions of the advertisements instead of paper advertisements.

In one embodiment, the electronic representation of an advertisement may be sent by an email to each of the residents listed in the electronic delivery list. The advertisement may be sent as an attachment to the email, or an email may be used which includes the same information that appears in the mailed advertisement in the body of the email. In this embodiment, the records in the electronic delivery list include the email address of the resident and the mailing address of the resident. Alternatively, the advertisement may be sent as an attachment to a text message. The electronic delivery list may then include the mobile phone number of the resident and the mailing address of the resident. This is the simplest method of implementing electronic delivery of the advertisement, where the email or mobile phone number of the resident is substituted for the mailing address during an advertising campaign. Methods of sending electronic advertisements using mobile or computer based messaging are described in: U.S. Pat. No. 8,797,906 to Makhoul et al; U.S. Patent Application Publication No. 2010/0262428 to Goldsmith; U.S. Patent Application Publication No. 2016/0132937 to Khoo et al.; and U.S. Patent Application Publication No. 2016/0210598 to Novik et al., all of which are incorporated herein by reference.

Social media may also be used to deliver electronic representations of advertisements to the residents on the electronic delivery list. For example, the electronic delivery list may include access links to the Facebook page of the user. The advertisement may be "delivered" to the resident as a post to their Facebook page. Other social media outlets, for example Twitter, Instagram, Snapchat, and others may also be utilized in a similar manner.

In one embodiment, an electronic account for each resident associated with the electronic delivery list is created when the resident is entered into the list. A user interface is linked to the electronic account and allows each resident associated with the electronic delivery list to access an electronic representation of the advertisement. The electronic account may include one or more electronic representations of advertisements that would have normally been mailed to the resident. In some embodiments, the electronic account allows access to a dedicated website that allows the resident to view advertisements sent to the resident's account. The website may operate as a "bulletin board" or repository, for a preselected time period (e.g., one week, two weeks, one month, while the offer or coupon has not yet expired, etc.), which includes electronic representations of the advertisements that would have been mailed to the resident during the preselected time period.

In an embodiment, an application specific to the mail reduction program is used to provide access to electronic representations of the advertisement and/or advertisements. For example, an application that runs on a mobile phone or tablet will provide access to electronic representations of advertisements that have been electronically delivered to the resident. The application may include the ability to provide push notifications that will inform the resident that there are unviewed advertisements in their electronic account.

When implemented as an application (e.g., on a mobile phone or tablet) a resident will download the mail reduction program application (or other similar application). The resident will then create an electronic account. The electronic account will be associated with at least the mailing address of the resident. The electronic account may also obtain other personal information from the resident such as name, phone number, email address, interests, preferred businesses, etc. Once the resident signs up with the mail reduction program, the resident will be removed from the mailing list of one or more advertisers that send bulk mail advertising to the residents of the geographical area that the resident resides.

In a preferred embodiment, the resident will be removed from all businesses, marketers, advertisers, and other mailing entities, that participate in the mail reduction program, that send bulk mail advertisements to the resident's geographical area. The scrubbed mailing address list, prepared from residents opting in to the program, will be used to prepare advertisements for multiple different advertisers that exclude the residents who have sent notification (e.g., to mail reduction program) to receive bulk mail advertising through the application. The residents removed from the bulk mail mailing list receive electronic representations of advertisements from all of the businesses, marketers, advertisers, and other mailing entities, that participate in the mail reduction program. The electronic representations of the advertisements will be viewable through the mail reduction program application. The resident participating in this program (through use of the application) will reduce the amount of paper advertising delivered to their mailbox. The use of an application, accessible to mobile devices, offers additional advantages such as allowing the resident to access, organize, and use coupons on the mobile device.

Alternatively, the businesses, marketers, advertisers, and other mailing entities, that participate in the mail reduction program may be sent a copy of the electronic delivery list (i.e., the list of mailing addresses that represent residents participating in the program). The businesses, marketers, advertisers, and other mailing entities may use the electronic delivery list to create their own scrubbed list from their own internal mailing list.

The advertiser works with the mail reduction program to ensure that the paper advertisements are only sent to the residents, in the geographical area, that do not participate in the program. The advertiser benefits by reducing their advertising costs by converting mailed paper advertising to electronic representations through the Bulk Mail Conversion Company. The mail reduction program can be implemented, by the advertiser or a third party company, using a centralized server or web site or batch process. The mail reduction program may allow advertisers to have access to scrubbed mailing address lists and control which advertisement(s) remain accessible to the enrolled residents through a centralized server or web site. Alternatively, the advertiser may have access to the electronic delivery list, allowing the advertiser to prepare their own scrubbed mailing list.

When operated by a third party company, the company may charge the advertiser a small fee. In some embodiments, as an incentive to attract advertisers to participate, the fees charged may be a percentage of the money that is saved by shifting direct mailing to electronic representations. Alternatively, the fees charged can be a percentage of profits attributable to participation in the mail reduction program. In some embodiments, both fees and a percentage of profits are provided by the advertiser as compensation to the third party company. The mail reduction program is not necessarily meant to entirely replace bulk mail advertising, but to supplement bulk mail advertising by offering electronic conversion and thus printing and mailing costs.

The mail reduction program also includes certain compliance features that ensure that both the resident and the advertisers are adhering to the program. One such feature relates to ensuring that the person entering the program resides at the residential address being provided to the program. In one embodiment, GPS (or other locating features) of the mobile device can be used to confirm the address of the person entering the program. For instance, the mail reduction program may ask that the resident send a confirmation signal, which includes tracking information, when they are at their residence. The tracking information can be used, by the mail reduction program, to ensure that addresses proved by the residents are accurate. Commercially available mailing lists, provided by companies that verify the mailing list (e.g., LexisNexis), may be used without verification.

The advertiser may also need assurances that the resident is viewing the electronic representations of the advertisements that are sent through the mail reduction program. In an embodiment, the resident may be required to sign into the mail reduction program application (or website) periodically. For example, a resident may be required to sign into the program X number of times during a time (Y) to view the advertisement(s) or a certain portion of advertisements through a game or task or any other activity. The intention of the requirement would be to provide a similar or greater advertising exposure to a resident physically throwing away the paper mail. Failure for the resident to comply with the viewing requirements will eventually result in the resident being removed from the electronic delivery list, and thus added to the scrubbed list. Once added to the scrubbed list, the resident will begin receiving paper advertisements through the mail once again.

Additionally, there may be compliance monitoring for the advertisers, to ensure that the residents that are participating in the program are no longer receiving mailed advertisements. For example, the mail reduction program application may allow the resident to file a complaint when a paper advertisement is received from an advertiser that is participating in the program. The mail reduction program may charge penalties against the advertiser for non-compliance.

The mail reduction program may also ensure proper compliance by monitoring National Change of Address (NCOA) databases and other vendor mailing lists. If a participant in the mail reduction program changes their address, the mail reduction program may need to alter the geographical area(s) associated with the participant. The mail reduction program may also send emails, or other notifications, if a change of address is detected.

Incentive programs may also be incorporated into the mail reduction program. For residents enrolled in the program, incentives to remain in the program may be offered, through additional coupons (not available through a direct mail campaign), gift cards, or other financial incentives. Additionally, the residents enrolled in the program may be provided information regarding the reduced environmental impact due to their participation in the program. For example, the residents enrolled in the program may be provided with a paper mail savings report, which includes the amount of mail that has been redirected into an electronic form and the amount of trees saved by the redirection of paper advertisements. Other information may be provided, such as the amount of ink saved, the amount of printing time saved, the reduction in workforce hours, and other resources expended to produce paper advertisements.

The mail reduction program may also provide advertisers customer/resident coupon usage, for both electronic and paper formats. Along with usage, the mail reduction program can also provide the advertisers with location data (e.g., which locations the coupons are used). This information can be analyzed by the advertisers to provide the advertisers with customer/resident behavior insights. These insights can lead to more targeted price ad advertising by the advertiser. In some embodiments, the mail reduction program provides this information as an incentive for the advertiser to join the program, or, alternatively, the data may be sold to the advertiser.

One advantage of the mail reduction program, for advertisers, is that the program will reduce the number of paper advertisements that need to be prepared. This will result in cost savings for the company. In one embodiment, the mail reduction program will keep track of the number of paper mailings that were saved and the approximate cost savings by using paper dimensions, printing cost data, and other data provided by the advertiser for each advertisement that would have been otherwise sent in a paper format to the resident or mailing address for the particular geographical area.

Embodiments of the present disclosure may be realized in any of various forms. For example, some embodiments may be realized as a computer-implemented method, as a computer-readable memory medium, or as a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, when executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets).

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system for placing a mailing address on an advertisement, the system comprising:

a printer;
a processor coupled to the printer;
a memory coupled to the processor; and
nontransitory program instructions stored in the memory;
wherein the processor executes the nontransitory program instructions, and wherein the nontransitory program instructions cause the processor to:
    receive a notification from at least one person associated with a residential mailing address list for a geographical area, wherein the notification comprises a consent to receive an electronic representation of an advertisement obtained from an advertiser and a residential mailing address of the at least one person from whom the notification was received;
    remove, from the residential mailing address list for the geographical area, the residential mailing address of the at least one person from the received notification to create a scrubbed mailing address list for the geographical area, wherein the scrubbed mailing address list is a list of residential mailing addresses in the geographical area to be placed on a plurality of copies of the advertisement obtained from the advertiser;
    determine whether the at least one person from the received notification has accessed the electronic representation of the advertisement according to a requirement;
    in response to the at least one person from the received notification being determined to have failed to access the electronic representation of the advertisement according to the requirement, add the at least one person to the scrubbed mailing address list for the geographical area; and
    print, using the printer, a residential mailing address from the scrubbed mailing address list on a single copy of the advertisement obtained from the advertiser.

2. The system of claim 1, wherein the plurality of copies of the advertisement obtained from the advertiser comprise unprinted regions for receiving a mailing address, and wherein the printer prints the residential mailing address from the scrubbed mailing address list in the unprinted region on the single copy of the advertisement obtained from the advertiser.

3. The system of claim 1, wherein the nontransitory program instructions cause the processor to print, using the printer, the plurality of copies of the advertisement obtained from the advertiser with each printed copy of the advertisement comprising an unprinted region for receiving a mailing address.

4. The system of claim 3, wherein the nontransitory program instructions cause the processor to print, using the printer, the residential mailing address from the scrubbed mailing address list on the single copy of the advertisement simultaneously with the printing of the printed copy of the advertisement.

5. The system of claim 1, wherein the nontransitory program instructions cause the processor to:
    receive notifications from a plurality of people associated with the residential mailing address list for the geographical area, wherein the notifications comprise consents to receive electronic representations of the advertisement and residential mailing addresses of the people from the received notifications; and
    remove, from the residential mailing address list for the geographical area, the residential mailing addresses associated with the people from the received notifications to create the scrubbed mailing address list for the geographical area.

6. The system of claim 1, wherein the nontransitory program instructions cause the processor to print an opt-in message on the single printed copy of the advertisement, wherein the opt-in message comprises instructions for a person who receives the advertisement to send the notification comprising the consent to receive the electronic representation of the advertisement.

7. The system of claim 1, wherein the nontransitory program instructions cause the processor to print, using the printer, each additional residential mailing address from the scrubbed mailing address list on a single additional copy of the plurality of copies of the advertisement obtained from the advertiser.

8. The system of claim 1, wherein the nontransitory program instructions cause the processor to determine whether the at least one person from the received notification has accessed the electronic representation of the advertisement according to the requirement by determining whether the at least one person from the received notification has accessed the electronic representation of the advertisement a selected number of times over a period of time.

9. An automated method for placing a mailing address on an advertisement, the method comprising:
   obtaining a plurality of copies of an advertisement to be sent to a plurality of residential mailing addresses associated with a residential mailing address list for a geographical area;
   receiving a notification from at least one person associated with the residential mailing address list for the geographical area, wherein the notification comprises a consent to receive an electronic representation of the advertisement and a residential mailing address of the at least one person from whom the notification was received;
   removing, from the residential mailing address list for the geographical area, the residential mailing address of the at least one person from the received notification to create a scrubbed mailing address list for the geographical area, wherein the scrubbed mailing address list is a list of residential mailing addresses in the geographical area to be placed on the plurality of obtained copies of the advertisement;
   determining whether the at least one person from the received notification has accessed the electronic representation of the advertisement according to a requirement;
   in response to the at least one person from the received notification being determined to have failed to access the electronic representation of the advertisement according to the requirement, adding the at least one person to the scrubbed mailing address list for the geographical area; and
   placing a residential mailing address from the scrubbed mailing address list on a single copy of the plurality of obtained copies of the advertisement.

10. The method of claim 9, wherein obtaining the plurality of copies of the advertisement comprises receiving the plurality of copies of the advertisement from an advertiser, wherein the single copy of the advertisement comprises an unprinted region for receiving a mailing address, the method further comprising placing the residential mailing address from the scrubbed mailing address list in the unprinted region on the single copy of the advertisement.

11. The method of claim 9, wherein obtaining the plurality of advertisements comprises printing the plurality of copies of the advertisement wherein each printed copy of the advertisement comprises an unprinted region for receiving a mailing address.

12. The method of claim 11, further comprising printing the residential mailing address from the scrubbed mailing address list on the single copy of the advertisement simultaneously with the printing of the single copy of the advertisement.

13. The method of claim 9, wherein the geographical area is a city.

14. The method of claim 9, wherein the geographical area is a geographic area associated with a postal code.

15. The method of claim 9, further comprising obtaining the scrubbed mailing address list by:
   receiving notifications from a plurality of people associated with the residential mailing address list for the geographical area, wherein the notifications comprise consents to receive electronic representations of the advertisement and residential mailing addresses of the people from the received notifications; and
   removing, from the residential mailing address list for the geographical area, the residential mailing addresses associated with the people from the received notifications to create the scrubbed mailing address list for the geographical area.

16. The method of claim 9, further comprising obtaining a confirmation that the at least one person from the received notification resides at the residential mailing address associated with the notification.

17. The method of claim 9, further comprising placing an opt-in message on the single copy of the advertisement, wherein the opt-in message comprises instructions for a person who receives the advertisement to send the notification comprising the consent to receive the electronic representation of the advertisement.

18. The method of claim 9, further comprising placing each additional residential mailing address from the scrubbed mailing address list on a single additional copy of the plurality of obtained copies of the advertisement.

19. The method of claim 9, wherein determining whether the at least one person from the received notification has accessed the electronic representation of the advertisement according to the requirement comprises determining whether the at least one person from the received notification has accessed the electronic representation of the advertisement a selected number of times over a period of time.

* * * * *